United States Patent
Jeon

(10) Patent No.: US 9,321,443 B2
(45) Date of Patent: Apr. 26, 2016

(54) RESERVOIR TANK OF BRAKE MASTER CYLINDER

(71) Applicant: MANDO CORPORATION, Pyeongtaek-si, Gyeonggi-do (KR)

(72) Inventor: Soo-Yong Jeon, Gunpo-si (KR)

(73) Assignee: MANDO CORPORATION, Pyeongtaek-Si, Gyeonggi-Do (KR)

( * ) Notice: Subject to any disclaimer, the term of this patent is extended or adjusted under 35 U.S.C. 154(b) by 366 days.

(21) Appl. No.: 14/151,432

(22) Filed: Jan. 9, 2014

(65) Prior Publication Data

US 2014/0196453 A1 Jul. 17, 2014

(30) Foreign Application Priority Data

Jan. 15, 2013 (KR) .................. 10-2013-0004212

(51) Int. Cl.
*B60T 11/26* (2006.01)
*B65D 51/16* (2006.01)

(52) U.S. Cl.
CPC ............. *B60T 11/26* (2013.01); *B65D 51/1616* (2013.01)

(58) Field of Classification Search
CPC ..... B60T 11/26; B60T 11/10; B65D 51/1616; B65D 51/16; B65D 51/1605; B65D 51/1661; B65D 47/32; B60K 15/035; B60K 15/04; B60K 15/05; B60K 15/03504; B01D 29/96; B01D 29/965; B01D 29/11; B01D 29/114; B01D 29/117
USPC ............... 220/371, 372, 367.1; 215/308, 307; 137/589, 588, 587, 583, 547, 549, 592, 137/590
See application file for complete search history.

(56) References Cited

U.S. PATENT DOCUMENTS

| | | | | |
|---|---|---|---|---|
| 1,652,929 A * | 12/1927 | Cawood | ................... | F16K 3/26 137/544 |
| 2,048,718 A * | 7/1936 | Wemhoener | ....... | B01D 46/0031 220/371 |
| 2,301,988 A * | 11/1942 | Wallenmeyer | ..... | B65D 51/1616 220/231 |
| 2,631,049 A * | 3/1953 | McGillis | ................. | F16K 24/06 137/583 |
| 4,198,824 A * | 4/1980 | Nogami | .................. | B60T 11/26 220/203.11 |
| 4,289,162 A * | 9/1981 | Nomura | .................. | B60T 11/26 137/572 |
| 2013/0014853 A1* | 1/2013 | Hunt | ..................... | B60K 15/04 141/1 |

FOREIGN PATENT DOCUMENTS

DE 10353669 A1 6/2005
DE 102005048696 A1 4/2007
(Continued)

OTHER PUBLICATIONS

Translation of DE10353669 (Konert et al.) Jun. 23, 2005, Fig. 1.*

(Continued)

*Primary Examiner* — Robert J Hicks
(74) *Attorney, Agent, or Firm* — Hauptman Ham, LLP

(57) ABSTRACT

A reservoir tank of a brake master cylinder, in which the reservoir tank includes a reservoir body to store oil therein, the reservoir body being provided with an oil introduction port, a filter interrupted by a fixing step arranged at a lower portion of the oil introduction port, and a reservoir cap arranged at an upper portion of the oil introduction port, wherein a vent member is provided between the fixing step and the filter, to allow inflow of air through during introduction of oil.

5 Claims, 3 Drawing Sheets

(56) References Cited

FOREIGN PATENT DOCUMENTS

| DE | 102007037225 A1 | 1/2009 |
|----|-----------------|--------|
| KR | 102011008693 A  | 8/2011 |

OTHER PUBLICATIONS

German Office Action dated Jul. 13, 2015 in connection with the counterpart German Patent Application No. 102014000319.1.

* cited by examiner

RESERVOIR TANK OF BRAKE MASTER CYLINDER

CROSS-REFERENCE TO RELATED APPLICATION(S)

This application claims the benefit of Korean Patent Application No. 2013-0004212, filed on Jan. 15, 2013 in the Korean Intellectual Property Office, the disclosure of which is incorporated herein by reference.

BACKGROUND

1. Field

Embodiments of the present invention relate to a reservoir tank of a brake master cylinder of a vehicle, and more particularly, to a structure facilitating introduction of oil into the reservoir tank.

2. Description of the Related Art

Generally, a master cylinder of a vehicle brake is a device to generate braking force by receiving force applied thereto by a booster, converting the force into hydraulic pressure, and transferring the hydraulic pressure to wheel cylinders. Operation of the master cylinder is briefly described below.

When a driver depresses a pedal provided below the driver's seat of a vehicle, the depressing force is transferred to the booster, and the booster in turn delivers, to the master cylinder, force increased from the initial force applied to the pedal according to the pressure difference between vacuum and the atmosphere. By the delivered force, two pistons installed in the master cylinder are moved forward. Thereby, oil is delivered to the wheel cylinders of the vehicle, and braking force is generated by the pressure of the delivered fluid.

A reservoir tank to store oil supplied to the master cylinder is arranged at the upper portion of the master cylinder. The reservoir tank includes a tank body having an oil introduction portion at the upper portion of the tank body, and a filter and a cap arranged at the oil introduction port.

CITED REFERENCE

Patent Document

Korean Patent Application Publication No. 2011-0086893 (Aug. 2, 2011)

SUMMARY

Therefore, it is an aspect of the present invention to provide a reservoir tank of a brake master cylinder capable of facilitating introduction of oil.

Additional aspects of the invention will be set forth in part in the description which follows and, in part, will be obvious from the description, or may be learned by practice of the invention.

In accordance with one aspect of the present invention, a reservoir tank of a brake master cylinder includes a reservoir body, a filter and a reservoir cap. The reservoir body may be configured to store oil therein and provided with an oil introduction port. The filter may be interrupted by a fixing step arranged at a lower portion of the oil introduction port. The reservoir cap may be arranged at an upper portion of the oil introduction port. A vent member may be provided between the fixing step and the filter, to allow inflow of air therethrough during introduction of oil.

The filter may include a flange part interrupted by the fixing step and a body part passing through the fixing step. The flange part or the fixing step may be formed with at least one vent protrusion provided between the flange part and the fixing step facing each other.

The at least one vent protrusion may include a plurality of vent protrusions arranged spaced apart from each other on a bottom surface of the flange part in a circumferential direction.

The body part may include an interruption protrusion interrupted by the fixing step. The fixing step of the oil introduction port may be interposed between the vent protrusion and the interruption protrusion.

A space between the vent protrusion and the interruption protrusion may be wider than a thickness of the fixing step.

BRIEF DESCRIPTION OF THE DRAWINGS

These and/or other aspects of the invention will become apparent and more readily appreciated from the following description of the embodiments, taken in conjunction with the accompanying drawings, of which.

DETAILED DESCRIPTION

Figure 1:
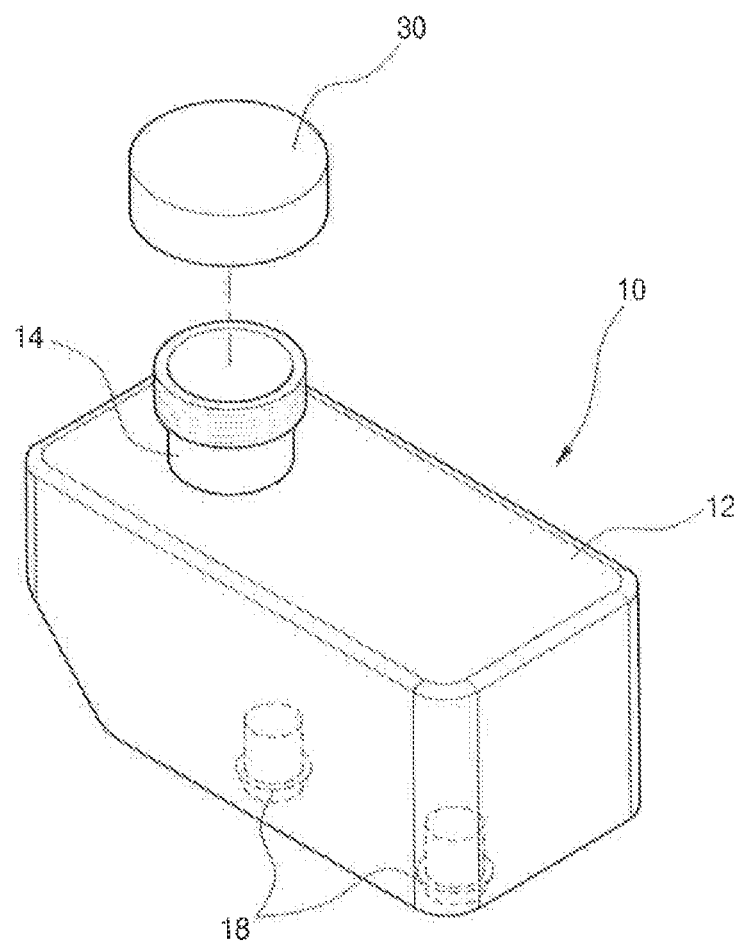
FIG. 1 is a perspective view illustrating a reservoir tank of a brake master cylinder according to an exemplary embodiment of the present invention.

Reference will now be made in detail to the embodiments of the present invention, examples of which are illustrated in the accompanying drawings. Embodiments described below are exemplarily provided to sufficiently inform those skilled in the art of the spirit of the present invention. Accordingly, rather than being limited to the embodiments described below, the present invention may be implemented in other forms. Further, for clear illustration of the present invention, constituents unrelated to the description are not shown in the drawings. The widths, lengths and thicknesses of some of the constituents shown in the drawings may be exaggerated for ease of the description. Like reference numerals refer to like elements throughout the specification.

Figure 2:
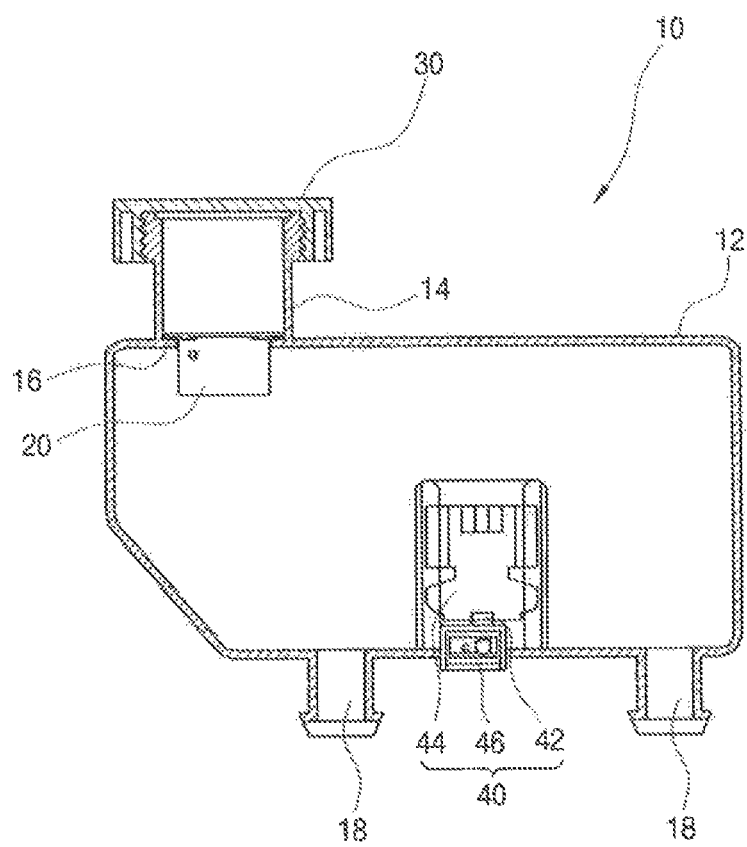
FIG. 2 is a cross-sectional view illustrating a reservoir tank of a brake master cylinder according to one embodiment of the present invention.
Figure 3:
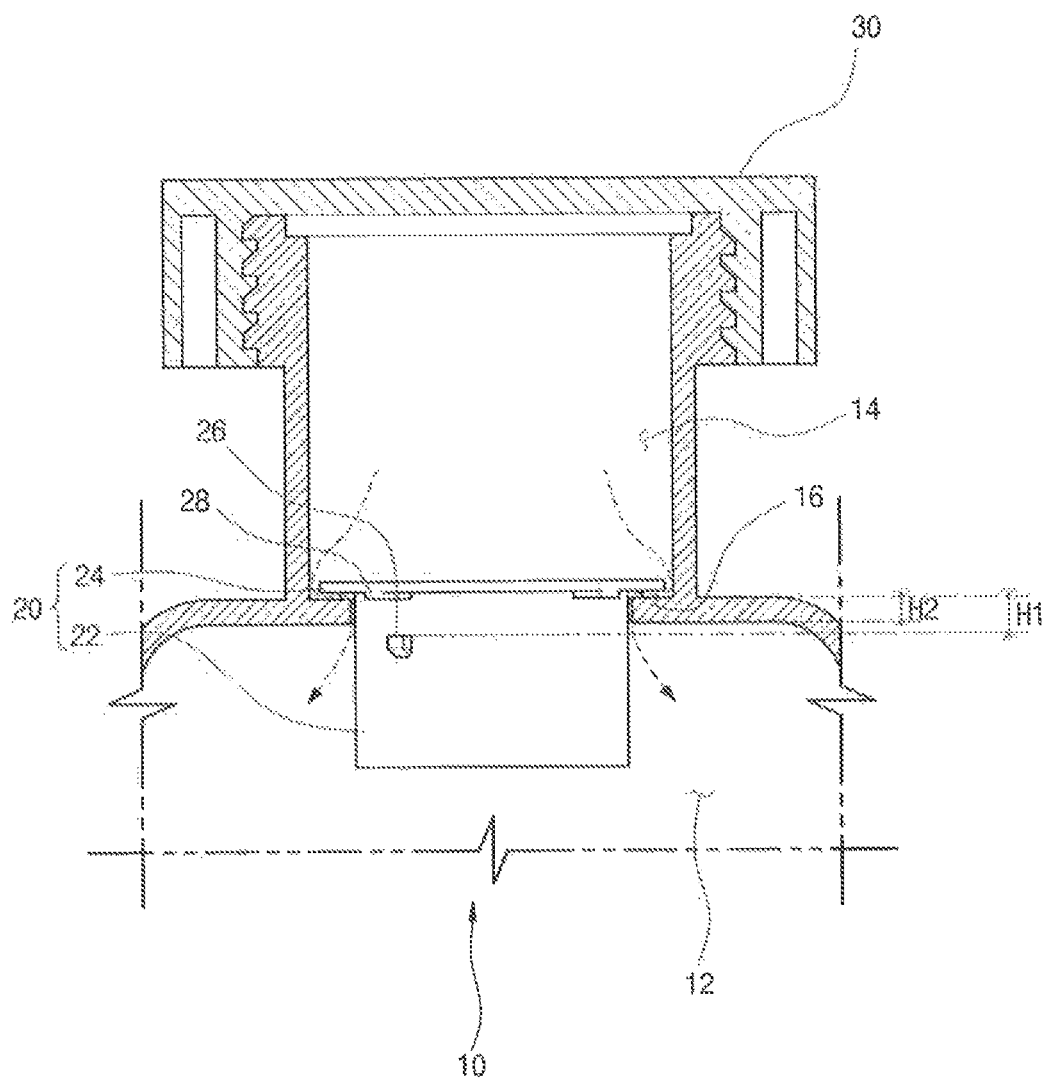
FIG. 3 is a partially enlarged view of FIG. 2.

FIG. 1 is a perspective view showing the external appearance of a reservoir tank of a brake master cylinder according to an exemplary embodiment of the present invention, FIG. 2 is a cross-sectional view of FIG. 1, and FIG. 3 is a partially enlarged view of FIG. 2.

Referring to FIGS. 1 to 3, a reservoir tank 10 according to this embodiment includes a reservoir body 12 to store oil to be supplied to a brake master cylinder (not shown).

An oil introduction port 14 for introduction of oil is formed at the upper portion of the reservoir body 12, and a reservoir cap 30 is mounted to the oil introduction port 14. The reservoir cap 30 seals the upper portion of the oil introduction port 14 to prevent flow of air or oil through the oil introduction port when mounted to the reservoir body.

As shown in the enlarged view of FIG. 3, a fixing step 16 having a diameter smaller than that of the path of the oil introduction port 14 is provided between the oil introduction port 14 and the reservoir body 12, i.e., at the lower portion of the oil introduction port 14.

A filter 20 is arranged at the fixing step 16 of the oil introduction port. The filter 20, which is formed in a cylindrical shape, includes a body part 22 and a flange 24. The body part 22 extends from the side of the oil introduction port into the body 12 through the fixing step 16, and the flange 24 is held by the fixing step 16 at the oil introduction port side.

In addition, the filter 20 is provided with an interruption protrusion 26 on the surface of the body part 22 to allow the fixing step 16 to be interposed between the flange 24 and the interruption protrusion 26 to prevent escape of the filter 20. The lower side of the interruption protrusion 26 is formed to slantingly extend from the body part and the upper side of the interruption protrusion is formed to perpendicularly extend from the body part. Thereby, insertion of the fixing step 16 may be easy, but retrieval thereof may be difficult.

In addition, the filter 20 is provided with at least one vent protrusion 28 on the bottom surface of the flange 24 contacting the fixing step 16. For example, four vent protrusions 28 may be arranged spaced 90 degrees apart from each other in a circumferential direction of the flange 24 and provided with a height of about 1 mm to allow air to flow through the space between the vent protrusions. In addition, the space H1 between the vent protrusions 28 and the interruption protrusion 26 is formed to be greater than the thickness H2 of the fixing step 16 such that the space through which air passes is selectively expandable according to the inflow rate of the introduced oil.

According to this embodiment, the vent protrusion 28 formed on the bottom surface of the flange part 24 is illustrated as a vent member configured to allow inflow of air between the fixing step 16 of the oil introduction port and the flange part 24 of the filter 20 during introduction of oil, but the bent member of the present invention is not limited thereto. For example, a vent protrusion may be provided on the fixing protrusion 16 making contact with the flange part 24, instead of on the bottom surface of the flange part 24. Alternatively, a ring may be provided on the fixing step or the flange part, and a plurality of vent holes may be formed through the ring along a circumferential direction thereof.

In addition, the filter 20 in accordance with this embodiment may be integrated with the interruption protrusion 26 and the vent protrusions 28 into one member. Accordingly, compared to a conventional filter defining an oil flow passage therethrough, manufacturing costs may be reduced. The dotted line shown in FIG. 3 indicates the direction of introduction of oil.

Meanwhile, an oil discharge port 18 is formed at a lower portion of the reservoir body 12 to allow oil to flow to the brake master cylinder (not shown) therethrough. The reservoir body 12 may be formed of a transparent material to allow the amount of remaining oil to be checked from the outside of the reservoir body.

In addition, the reservoir tank 10 is provided with an oil amount sensing device 40 to inform the driver of when to add oil by turning on a warning lamp provided near the driver's seat according to the amount of the remaining oil in the reservoir body 12. The oil amount sensing device is installed in the reservoir body 12 so as to float on the oil surface. The oil amount sensing device includes a float 44, which has a magnet 42 installed at the lower portion thereof, and an oil amount sensing switch 46 installed at the lower portion of the float 44.

Accordingly, when the amount of oil in the reservoir body 12 is reduced and thus the magnet 42 of the float 44 approaches the oil amount sensing switch 46, the oil amount sensing switch 46 senses this approach and causes the warning lamp provided to the driver's seat to turn on. Thereby, the driver may recognize when to add brake oil through the light.

As is apparent from the above description, a reservoir tank of a brake master cylinder according to one embodiment of the present invention can greatly reduce time for oil introduction by providing a bent member between an oil introduction port and a filter to form a passage allowing inflow of air therethrough during introduction of oil.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A reservoir tank of a brake master cylinder comprising:
a reservoir body to store oil therein, the reservoir body being provided with an oil introduction port;
a filter interrupted by a fixing step arranged at a lower portion of the oil introduction port; and
a reservoir cap arranged at an upper portion of the oil introduction port,
wherein a vent member is provided between the fixing step and the filter, to allow inflow of air there through during introduction of oil.

2. The reservoir tank according to claim 1, wherein: the filter comprises a flange part interrupted by the fixing step and a body part passing through the fixing step; and
wherein the flange part or the fixing step is formed with at least one vent protrusion provided between the flange part and the fixing step facing each other.

3. The reservoir tank according to claim 2, wherein the at least one vent protrusion comprises a plurality of vent protrusions arranged spaced apart from each other on a bottom surface of the flange part in a circumferential direction.

4. The reservoir tank according to claim 2, wherein the body part comprises an interruption protrusion interrupted by the fixing step,
wherein the fixing step of the oil introduction port is interposed between the vent protrusion and the interruption protrusion.

5. The reservoir tank according to claim 4, wherein a space between the vent protrusion and the interruption protrusion is wider than a thickness of the fixing step.

* * * * *